Sept. 6, 1949.　　　　V. P. DONNER　　　　2,481,404
HYDRAULIC FITTING
Filed Feb. 23, 1944　　　　　　　　　　　　2 Sheets-Sheet 1
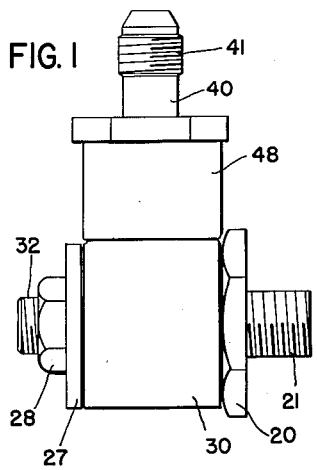
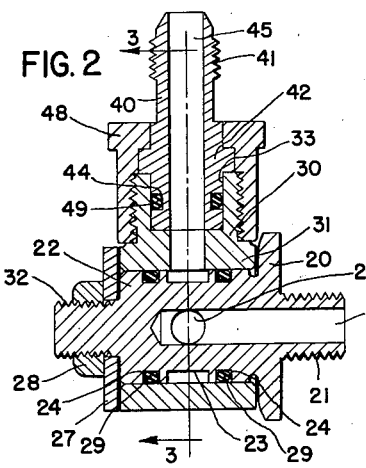
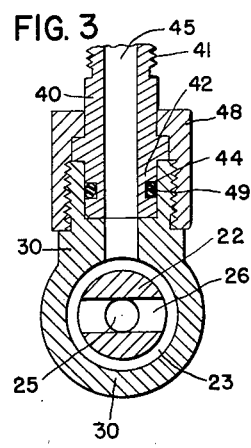
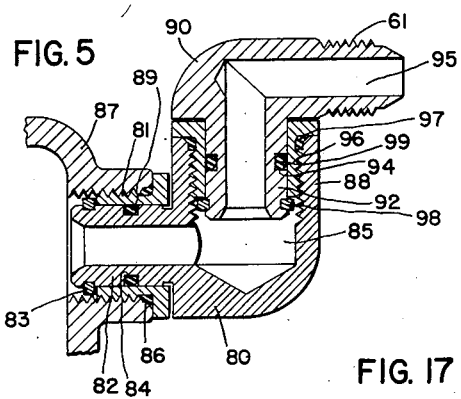
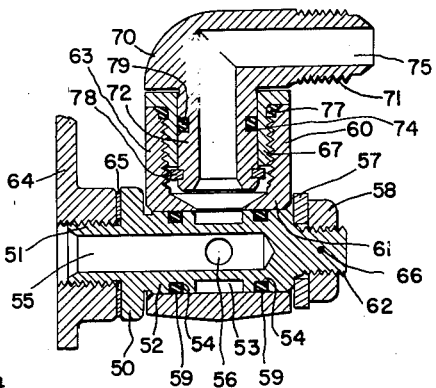
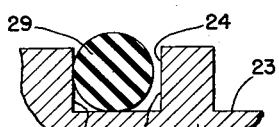
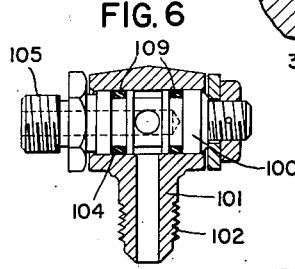
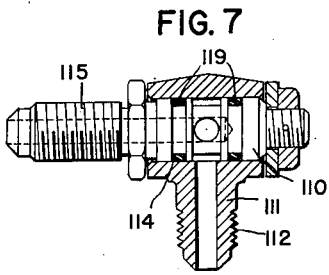
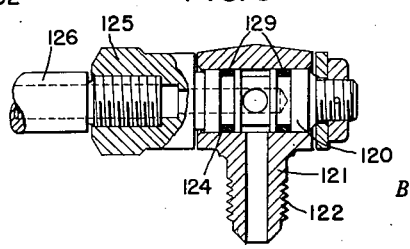
INVENTOR.
VERNE P DONNER
BY
ATTORNEY Sept. 6, 1949.     V. P. DONNER     2,481,404
HYDRAULIC FITTING Filed Feb. 23, 1944     2 Sheets-Sheet 2

*INVENTOR.*
VERNE P. DONNER
BY
*ATTORNEY*

Patented Sept. 6, 1949

2,481,404

UNITED STATES PATENT OFFICE 2,481,404

HYDRAULIC FITTING

Verne P. Donner, Buffalo, N. Y., assignor to Curtiss-Wright Corporation, a corporation of Delaware Application February 23, 1944, Serial No. 523,776

5 Claims. (Cl. 285—96.3)

This invention relates to hydraulic or liquid fittings, such as elbows, couplings, connections, joints or the like, of the type wherein relative movement is permitted between the parts thereof. More particularly, the invention relates to such fittings of a type wherein the pressure of the contained liquid assists in maintaining a liquid tight seal.

The use of hydraulic systems, whether containing water, oil or other liquid, has recently found numerous applications in imparting motion to various control devices in automobiles, aircraft and the like. In such applications, flexible hose has been extensively used, but has several disadvantages as compared with metallic pipe conduits. In the use of the latter, however, couplings, fittings, connections, or joints permitting a certain amount of relative movement are required. In other applications, also, detachable couplings or connections, movable conduits or pipes and the like (e. g. for filling or emptying tank cars or other vehicles) require the use of movable or rotating fittings of this character. Hitherto, such couplings, fittings, connections and joints have suffered from the disadvantage that they are subject to excessive leakage at low pressures and low temperatures, and that rotation or relative movement is accomplished at high pressures, and sometimes even at low pressures, only with the application of a large torque.

It is therefore an object of this invention to provide rotating fittings for the conveyance of liquids, in which there is substantially no leakage at normal temperatures and pressures. It is another object to provide such fittings in which the protection against leakage extends to a temperature many degrees below zero Fahrenheit. It is a further object to provide such fittings in which the protection against leakage is maintained at very low pressures and at negative pressures or suction. It is a still further object to provide such fittings which can be easily rotated, with the application of only moderate torques at high pressures. Other objects will appear hereinafter.

Figure 9:
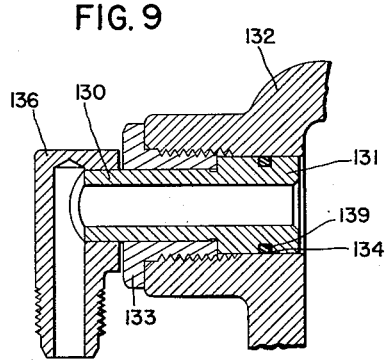
Figure 10:
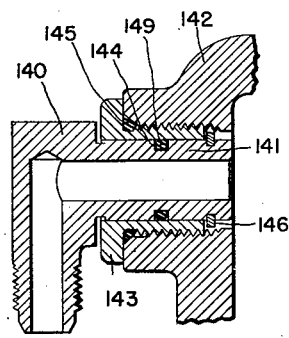
Figure 11:
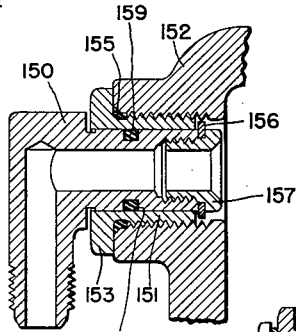
Figure 12:
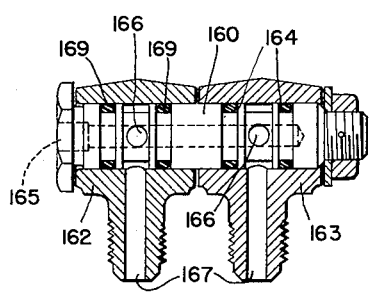
Figure 13:
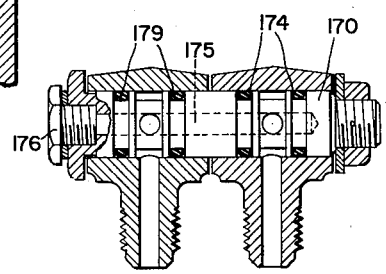
Figure 14:
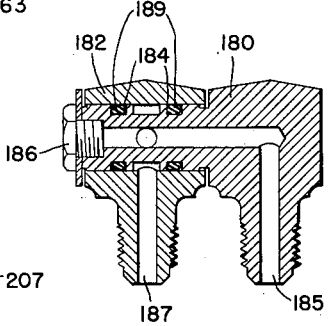
Figure 16:
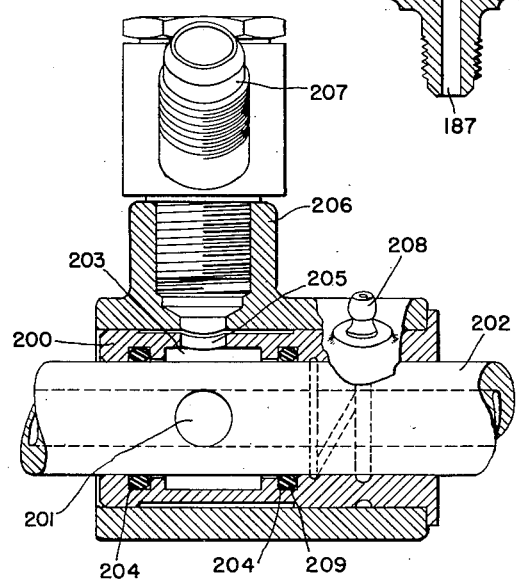
Figure 15:
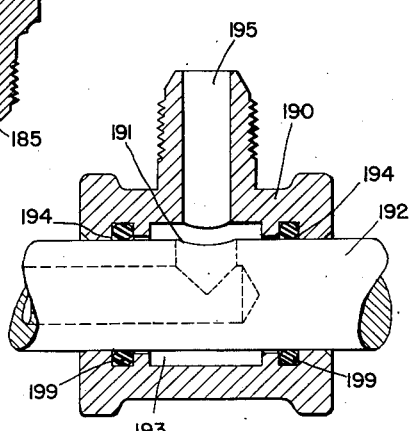

These objects are accomplished by the herein described and claimed invention, which may be more readily understood by reference to the accompanying drawings, in which: Figure 1 is a front elevational view of one type of fitting according to the present invention, in which the two halves of the fitting are each adapted to rotate about axes at right angles to each other. Figure 2 is a cross section taken along the center line of the device shown in Figure 1. Figure 3 is a section taken along the line 3—3 of Figure 2. Figure 4 is a cross-sectional view, corresponding to Figure 2, of another embodiment of the invention. Figure 5 is a cross-sectional view, corresponding to Figure 2, of still another embodiment of the invention. Figure 6 is a view, partly in cross-section and partly in elevation, of an embodiment of the invention in which only one-half the fitting is adapted to rotate, the other half being fixed. Figure 7 is a view, corresponding to Figure 6, of a modification of the fitting according to Figure 6 in which a slightly different type of stem end is employed. Figure 8 is a view, corresponding to Figure 6, of a modification of the fitting according to Figure 6 in which still another type of stem end is employed. Figure 9 is a cross-sectional view, corresponding to Figure 2, of an embodiment of the invention in which one-half of the fitting is journaled directly in an opening in the wall of a liquid-containing vessel such as a hydraulic cylinder. Figure 10 is a cross-sectional view, corresponding to Figure 2, of a modification of the fitting according to Figure 9 in which the seal is effected between one end of the fitting and a bushing inserted in the opening of the vessel. Figure 11 is a cross-sectional view, corresponding to Figure 2, of a modification of the fitting according to Figure 10 in which a slightly different type of stem end is employed. Figure 12 is a view, corresponding to Figure 6, of an embodiment of the invention providing three liquid inlets or outlets and in which both parts of the fitting independently rotate around a common axis. Figure 13 is a view, corresponding to Figure 6, of a modification of the fitting according to Figure 12 in which a plug is inserted in one of the three openings. Figure 14 is a view corresponding to Figure 6, of a modification of the fitting according to Figure 12 in which fewer packings are required. Figure 15 is a view, corresponding to Figure 6, of an embodiment of the invention in cooperation with a rotating shaft or for rotation about a shaft. Figure 16 is a view, corresponding to Figure 6, of a modification of the fitting according to Figure 15 employed in cooperation with a high pressure lubrication fitting of the "Alemite" type. Figure 17 is a greatly enlarged view of a portion of the fitting shown in Figure 2, with its associated sleeve removed therefrom.

Referring to Figures 1, 2, and 3, and particularly Figure 3, the fitting therein illustrated is adapted to be connected to a conduit, pipe, vessel, container, or the like by means of a threaded connection 21. The opposite end of the fitting is adapted to be connected to another conduit, pipe, vessel, container or the like by means of a threaded connection 41. As hereinafter described, rotation of each of these threaded connections about its axis is permitted, thus permitting relative movement of the conduits, pipes, vessels, containers, or the like, to which the fitting is connected. By combining one or more of these fittings together or with any of the other fittings hereinafter described, allowance for almost any desired relative movement can be provided.

The threaded connection 21 is part of a bolt stem 20 having a portion 22 with a machined cylindrical surface and provided with a central circumferential groove 23 and two narrow circumferential grooves 24 on either side thereof. The lands of the cylindrical portion 22 are chromium plated and ground. The stem 20 is hollow and open at the threaded end, the cylindrical opening 25 communicating with the groove 23 by means of cylindrical holes 26. Packing rings 29, as hereinafter described more in detail, are positioned in the grooves 24. A member 30, having a sleeve portion 31 provided with a honed bore, fits over the cylindrical portion 22 of the bolt stem 20, the clearance between the cylindrical portion 22 and the honed bore of sleeve 31 being between .001 and .003 inch. A washer 27 and a nut 28, fitted over the threaded end 32 of bolt stem 20, hold the member 30 in place, but permit rotational movement of the member 30 about the bolt stem 20 as an axis. The nut 28 is locked in place by any convenient means, such as a cotter pin.

The member 30 has a second sleeve portion 33, also provided with a honed bore. A second bolt stem 40, on the end portion of which is the threaded connection 41 hereinbefore described, is provided with a portion 42 having a machined cylindrical surface and is also provided with a hollow cylindrical bore 45 open at both ends. The cylindrical portion 42 is provided with a single groove 44 in which is positioned a packing ring 49 as hereinafter described. The bolt stem 40 fits into the sleeve portion 33, the clearance between the cylindrical portion 42 and the honed bore of sleeve portion 33 being between .001 and .003 inch. A threaded collar 48 holds bolt stem 40 in place, but permits rotational movement of such bolt stem within the sleeve portion 33.

It will be easily seen that passage of fluid within the fitting is through the hollow central portion 25 of bolt stem 20, thence through openings or holes 26 into circumferential groove 23, and finally into the hollow central portion 45 of bolt stem 40.

Referring now to Figure 4, the fitting therein illustrated is similar to that shown in Figures 1, 2 and 3, except that one of the bolt stems is held in place by means of a snap ring instead of a threaded collar. It is connected to a conduit, pipe, vessel, container, or the like 64 by means of a threaded connection 51, a liquid tight seal being effected by means of a gasket 65. The opposite end of the fitting is adapted to be connected to another conduit, pipe, vessel, container or the like by means of a threaded connection 71. The threaded connection 51 is part of a bolt stem 50 having a portion 52 with a machined cylindrical surface and provided with a circumferential groove 53 and two narrow circumferential grooves 54 on either side thereof. The lands of the cylindrical portion 52 are chromium plated and ground. The stem 50 is hollow and open at the threaded end, the hollow cylindrical portion 55 communicating with the groove 53 by means of cylindrical holes 56. Packing rings 59, as hereinafter described more in detail, are positioned in the grooves 54. A member 60, having a sleeve portion 61, provided with a honed bore, fits over the cylindrical portion 52 of the bolt stem 50, the clearance between the cylindrical portion 52 and the honed bore of sleeve 61 being between .001 and .003 inch. A washer 57 and a nut 58, fitted over the threaded end 62 of bolt stem 50, hold the member 60 in place on the bolt stem 50, but permit rotational movement of the member 60 about the bolt stem 50 as an axis. The nut 58 is locked in place by means of a cotter 66.

The member 60 is provided with a female threaded extension 63 at right angles to the sleeve portion 61. The extension 63 cooperates with a threaded bushing 67 having a honed cylindrical bore. A gasket 77 prevents liquid leakage between member 60 and bushing 67. A second bolt stem 70, on the end portion of which is the threaded connection 71 hereinbefore described, is provided with a portion 72 having a machined cylindrical surface and is also provided with a hollow cylindrical bore 75 open at both ends. The cylindrical portion 72 is provided with a single groove 74 in which is positioned a packing ring 79 as hereinafter described. The bolt stem 70 fits into the bushing 67, the clearance between the cylindrical portion 72 and the honed bore of bushing 67 being between .001 and .003 inch. A snap ring 78 holds bolt stem 70 in place, but permits rotational movement of such bolt stem within the bushing 67.

It will be easily seen that passage of fluid within the fitting is through the hollow central portion 55 of bolt stem 50, thence through openings or holes 56 into circumferential groove 53, and finally into the hollow central portion 75 of bolt stem 70.

In Figure 5 there is illustrated a form of fitting similar to that shown in Figure 4, except that the bolt stem on one end of the fitting is connected directly with the sleeve member of the other end of the fitting, so that a bolt member forms the external connection on one end and a sleeve member constitutes the external connection at the other end. This fitting is connected to a conduit, pipe, vessel, container or the like 87 by means of a threaded bushing 81, provided with a honed bore. A tight seal between bushing 81 and vessel 87 is provided by means of a gasket 86. A bolt stem 80 is provided with a portion 82 having a machined cylindrical external surface and is also provided with a hollow interior 85 open at both ends. The cylindrical portion 82 is provided with a single groove 84 in which is positioned a packing ring 89 as hereinafter described. The bolt stem 80 fits into the honed bore of bushing 81, the clearance between the cylindrical portion 82 and the honed bore of bushing 81 being between .001 and .003 inch. A snap ring 83 holds bolt stem 80 in place but permits rotational movement of such bolt stem within the bushing 81.

The member 80 is provided at its opposite end with hollow threaded extension 88 whose interior communicates with the hollow interior 85, the extension 88 being at right angles to the cylindrical portion 82. A threaded bushing 96 having a honed cylindrical bore is threaded onto extension 88, gasket 97 preventing leakage between extension 88 and bushing 96. A second bolt stem 90 is provided with a portion 92 having a machined cylindrical external surface and is also provided with a hollow interior 95 open at both ends. The cylindrical portion 92 is provided with a single groove 94 in which is positioned a packing ring 99, as hereinafter described. The bolt stem 90 fits into the bushing 96, the clearance between the cylindrical portion 92 and the honed bore of bushing 96 being between .001 and .003 inch. A snap ring 98 holds bolt stem 90 in place, but permits rotational movement of such bolt stem within the bushing 96. A threaded connection 61 on the end of bolt stem 90 adapts it to be connected to a conduit, pipe, vessel, container or the like.

It is easily seen that passage of fluid within the fitting is similar to that described in connection with other fittings according to the invention.

In Figures 6, 7, and 8 there are illustrated fittings similar to those shown in Figures 2 and 4 except that the members 101, 111, and 121 respectively, (corresponding to members 30 and 60) are directly provided with threaded ends 102, 112, and 122, respectively, instead of providing a second bolt stem corresponding to members 40 and 70 in Figures 2 and 4. In Figure 6 the threaded end 105 of bolt stem 100 is of standard type; in Figure 7 the threaded end 115 of bolt stem 110 is of bulk-head type; and in Figure 8 threaded end 125 of bolt stem 120 is of female threaded type permitting cooperation with a pipe or hollow shaft 126. Each of the three devices is provided with a pair of circumferential grooves 104, 114 and 124, respectively, in which are positioned packing rings 109, 119 and 129 respectively, as hereinafter described. The operation of these devices is similar to that shown in the other forms of the invention.

Figures 9, 10, and 11 illustrate forms of the invention in which only a single rotating part with a single packing ring is employed. In these forms of the invention a bushing 133, 143, and 153, respectively, is fitted into a threaded extension of an opening of a vessel, container or the like, 132, 142, and 152 respectively. In the form shown in Figure 9, the bolt stem 130 is provided with a portion 131 having a machined cylindrical surface, and a tightly fitting extension 136 at the opposite end thereof. The cylindrical portion 131 is provided with a single groove 134 in which is positioned a packing ring 139. The opening in the container 132 acts as the sleeve member, and has a honed inner surface into which the cylindrical portion 131 fits with a clearance of .001 to .003 inch. The bushing 133 is positioned in a depressed portion of the bolt stem 130 between extension 136 and cylindrical portion 131, and thus holds the fitting in place. In the form shown in Figure 10 the cylindrical portion 141 of bolt stem 140 fits into the honed inner surface of bushing 143, the latter acting as the sleeve member. The fitting is held in place by means of a snap ring 146. In the form shown in Figure 11 the cylindrical portion 151 of bolt stem 150 is again fitted into the honed inner surface of bushing 153. A threaded extension 157 screwed into the end of bolt stem 150 and provided with a snap ring 156 holds the fitting in place. The forms shown in Figures 9, 10 and 11 are provided with grooves 134, 144 and 154, respectively, in cylindrical portions 131, 141 and 151 respectively. Packing rings 139, 149 and 159, respectively, fit into the grooves, as hereinafter described. Leakage between the bushing 143 and the container 142 and between the bushing 153 and the container 152 is prevented by means of gaskets 145 and 155 respectively.

In the form shown in Figure 12, sleeve members 162 and 163 fit over and rotate about a single bolt stem 160. The fitting is therefore a double fitting analogous to the type shown in Figure 6. Grooves 164 in bolt stem 160 are provided with packing rings 169, as hereinafter described. The use of this fitting permits 3-way travel of liquid since the hollow cylindrical portion 165 of the bolt stem 160 is open at one end and also communicates through holes 166 with the hollow centers 167 of sleeves 162 and 163. The form shown in Figure 13 is very similar except that a plug 176 fits into the axial opening of hollow cylindrical portion 175. This plug may be utilized as a bleeder plug. The form shown in Figure 14 is partially analogous to that shown in Figure 13 and partially analogous to that shown in Figure 6. It is analogous to the form shown in Figure 13 in that 3-way movement of liquid is provided, with a bleeder plug 186 in one of the three openings. It is analogous to the form shown in Figure 6 in that only a single sleeve 182 is fitted on and rotates about bolt stem 180. Bolt stem 180 is turned at right angles to provide liquid flow through opening 185 in a plane parallel to that of the liquid flow through the opening 187. In the forms shown in Figures 13 and 14, grooves 174 and 184, respectively, are again provided on bolt stems 170 and 180, respectively. Packing rings 179 and 189, respectively, fit into these grooves, as hereinafter described.

The form shown in Figure 15 is adapted to cooperate with a hollow rotating shaft 192 acting as the stem member of the fitting and provided with a circumferential opening 191. The sleeve member 190, provided with circumferential opening 195 and groove 193, fits over shaft 192 with a clearance of approximately .001 to .003 inch. Two circumferential grooves 194 on the inner surface of sleeve 190 are provided with packing rings 199 as hereinafter described. This form of the invention differs from the form previously described in that the grooves 194 are on the inner surface of a sleeve instead of the outer surface of a bolt stem. This particular construction is somewhat more difficult to fabricate than that previously described and is therefore employed only when the previously described form is impractical.

The form of the invention shown in Figure 16 is generally similar to that shown in Figure 15 except that a high pressure lubrication fitting is used in cooperation therewith. A sleeve 200 fits over a hollow shaft 202 with a clearance of approximately .001 to .003 inch. A circumferential opening 205 communicates with the interior of shaft 202 by means of a groove 203 in sleeve 200 and a circumferential opening 201 in shaft 202. Lateral grooves 204 on the inner surface of sleeve 200 are provided with packing rings 209 as hereinafter described. A high pressure lubrication fitting 208 provides lubrication between the shaft 202 and the sleeve 200. A second sleeve 206 fits tightly over sleeve 200 and is provided with a nipple 207 extending upwards at an angle of 45°. In the form shown in Figure 16 pressure against the packing ring 209 may be applied from either direction. When liquid is passing through the nipple 207 and the hollow center of the shaft 202 the liquid pressure forces the ring 209 against the outer wall of the grooves 204. When lubrication is being applied to the shaft through the fitting 208 the pressure of the lubricant forces the right hand ring 209 against the inner wall of its groove 204.

The packing rings employed in the various fittings according to the present invention are of such a size and of such material that pressure of liquid within the fitting forces an effective seal between the bolt stem and its associated sleeve, and at the same time does not allow the frictional resistance against rotation of the sleeve about the stem to rise to an excessive figure. The material out of which the rings are made is any relatively soft flexible or resilient non-porous material resistant to attack by the liquid handled in the fitting. In the case of water it is preferably rubber or a rubber composition, but may be leather or other material. With respect to size, the grooves in which the packing rings lie must be slightly wider (that is, of the order of 5 to 15 percent and preferably about 10 percent) than the normal thickness of the rings positioned in such grooves. The width of the rings (that is, the difference between the internal diameter and the external diameter of the ring) should not be less than the depth of the groove and should not be so great as to cause an excessive increase in frictional resistance between the rings and the honed bores of their associated sleeves or the machined surfaces of their asscociated stems. This result is obtained when the grooves are of the order of 10 to 30 percent shallower, and preferably about 20 percent shallower than the thickness of the rings, the latter normally although not necessarily being equal to the width of the rings. The size and flexibility of the rings thus permits them to have a certain amount of movement within the confines of their grooves, and at the same time permits forming a static seal and also forcing each ring against one wall of its groove by means of the pressure of the contained liquid.

Figure 17 shows such a construction applied to the rings 29 and grooves 24 of Figure 1. However, a similar construction is employed with respect to ring 49 and groove 29, and also the rings and grooves of the forms illustrated in Figures 4 to 16, inclusive, of the drawings. This form of construction is such that the fit of the associated sleeve 31 (removed in Figure 17) forces the ring 29 down into the groove 24, forming a static seal. When the only applied pressure is the pressure of the sleeve 31, the ring 29 lies more or less loosely in the groove 24, filling substantially its entire width. When, however, pressure is applied through the medium of the groove 23, the ring is forced against the outer wall 35 of the groove. If the liquid is under suction, the ring will be forced against the opposite wall 36 of groove 24. In either case, due to the deformability or elasticity of the ring, the pressure of the ring against the sleeve 31 increases sufficiently to prevent leakage past the ring, and corresponding in magnitude to the pressure of the liquid. However, the main liquid pressure applied to the ring is against the wall 35, so that the frictional resistance between the moving parts (ring 29 and sleeve 31) is not increased to nearly as great an extent as with previously employed rotating fittings.

In employing the cooperating grooves and packing rings with the construction according to the present invention, it will be seen that movement of the packing rings is practically confined within the groove, when the parts of the fitting are in assembled relation. This result is facilitated by providing a close fitting (e. g. of the order of 0.001 to 0.003 inch) clearance between the bolt stem and sleeve, this clearance being not greater than one-half the difference between the width of the packing ring, as above defined, and the depth of the groove in which it lies. It is also facilitated substantially by providing such a form of groove that the only pressure (in the absence of fluid pressure) against the non-grooved sleeve (or bolt, in the form shown in Figures 15 and 16) is perpendicular to the surface of such non-grooved member. This is best obtained with grooves of substantially rectangular cross-section having substantially perpendicular side walls. It will be observed that, with this construction, it makes no difference in which direction fluid pressure is applied to the packing. The fitting may be used equally well under high pressures or under suction. In addition, as the pressure is increased in either direction, the tendency is to flatten out the packing ring against the wall 35 or 36. The pressure is thus transferred to the non-grooved member, but only in such a direction as to raise an effective barrier or seal against the leakage of fluid. This obviously also increases frictional resistance, but to a far lesser extent than in previous types of construction.

Since the above description is illustrative and not limitative, it is understood that many changes may be made in the described embodiments without departing from the spirit of the invention. Accordingly, it is understood that the invention is not to be limited except as defined by the appended claims.

I claim:

1. A rotating fitting for the conveyance of liquids, comprising a stem member having a cylindrical external surface portion, a hollow portion within said stem member having an axial opening and a substantially radial opening, a pair of lateral circumferential grooves entirely located in said cylindrical external surface portion of said stem member, a pair of packing rings of resilient material within said lateral grooves, a sleeve member having a cylindrical internal surface portion cooperating with and fitting over said cylindrical external surface portion of said stem member so as to permit relative rotation between said stem member and said sleeve member, a central circumferential groove between said lateral circumferential grooves and communicating with said substantially radial opening of said stem member, and an opening in said sleeve member communicating with said central circumferential groove, said packing rings being slightly wider and slightly thinner than the respective depth and width of said lateral grooves and being so proportioned as to provide a substantially liquid tight seal substantially preventing leakage between said stem member and said sleeve member and at the same time a minimum of frictional resistance against relative rotation of said stem member and said sleeve member.

2. A rotating fitting for the conveyance of liquids, comprising a stem member having a cylindrical external surface portion, a hollow portion within said stem member having an axial opening and a substantially radial opening, a pair of lateral circumferential grooves substantially rectangular in cross section and entirely located in said cylindrical external surface portion of said stem member, a pair of packing rings of resilient material within said lateral grooves, a sleeve member having a cylindrical internal surface portion cooperating with and fitting over said cylindrical external surface portion of said stem member so as to permit relative rotation between said stem member and said sleeve member, a central circumferential groove between said lateral circumferential grooves and communicating with said substantially radial opening of said stem member, and an opening in said sleeve member communicating with said central circumferential groove, said lateral grooves being 10 to 30 percent shallower than the width of said packing rings and 5 to 15 percent narrower than the thickness of said packing rings, the excess of width of said packing rings over the depth of said lateral grooves being at least twice the clearance between said stem member and said sleeve member, so as to provide a substantially liquid tight seal substantially preventing leakage between said stem member and said sleeve member and at the same time a minimum of frictional resistance against relative rotation of said stem member and said sleeve member.

3. A rotating fitting for the conveyance of liquids, comprising a stem member having a cylindrical external surface portion, a hollow portion within said stem member having axial openings at both ends thereof, a circumferential groove entirely located in said external surface portion of said stem member, a packing ring of resilient material within said groove, a sleeve member having a cylindrical internal surface portion cooperating with and fitting over said cylindrical external surface portion of said stem member so as to permit relative rotation between said stem member and said sleeve member, and means for holding said stem member and said sleeve member in cooperating relationship, said packing ring being slightly wider and slightly thinner than the respective depth and width of said groove and being so proportioned as to provide a substantially liquid tight seal substantially preventing leakage between said stem member and said sleeve member and at the same time a minimum of frictional resistance against relative rotation of said stem member and said sleeve member.

4. A rotating fitting for the conveyance of liquids, comprising a stem member having a cylindrical external surface portion, a hollow portion within said stem member having axial openings at both ends thereof, a circumferential groove substantially rectangular in cross section and entirely located in said external surface portion of said stem member, a packing ring of resilient material within said groove, a sleeve member having a cylindrical internal surface portion cooperating with and fitting over said cylindrical external surface portion of said stem member so as to permit relative rotation between said stem member and said sleeve member, and means for holding said stem member and said sleeve member in cooperating relationship, said groove being 10 to 30 percent shallower than the width of said packing ring and 5 to 15 percent narrower than the thickness of said packing ring, the excess of width of said packing ring over the depth of said groove being at least twice the clearance between said stem member and said sleeve member, so as to provide a substantially liquid tight seal substantially preventing leakage between said stem member and said sleeve member and at the same time a minimum of frictional resistance against relative rotation of said stem member and said sleeve member.

5. A rotatable fitting for the conveyance of liquids comprising a stem member and a sleeve member, said members having interfitting cylindrical bearing portions, means for holding said members against relative axial displacement while permitting relative angular movement of them, the bearing portion of one member having a circumferential channel for liquids formed therein and each of said members having a passageway opening into said channel, a circumferential groove in the stem member on each side of the said channel, each groove being entirely within the cylindrical bearing portion of the stem member, and a flexible and elastic packing ring of substantially circular cross-section disposed and compressed radially in each groove, each groove being of greater axial dimension and of lesser radial dimension than the cross-sectional diameter of the packing ring when the latter is in normal, uncompressed condition.

VERNE P. DONNER.

REFERENCES CITED

The following references are of record in the file of this patent:

UNITED STATES PATENTS

| Number | Name | Date |
| --- | --- | --- |
| 1,532,774 | Page | Apr. 7, 1925 |
| 1,949,961 | Hansen | Mar. 6, 1934 |
| 1,985,012 | Boehm | Dec. 18, 1934 |
| 2,115,383 | Christensen | Apr. 26, 1938 |
| 2,307,328 | Martin | Jan. 5, 1943 |
| 2,400,658 | Shepherd | May 21, 1946 |

FOREIGN PATENTS

| Number | Country | Date |
| --- | --- | --- |
| 369,022 | Great Britain | Mar. 17, 1932 |